US012513452B2

(12) United States Patent
Filimonov et al.

(10) Patent No.: US 12,513,452 B2
(45) Date of Patent: Dec. 30, 2025

(54) METHOD FOR DETERMINING A FREQUENCY RESPONSE OF AN AUDIO SYSTEM

(71) Applicant: HARMAN INTERNATIONAL INDUSTRIES, INCORPORATED, Stamford, CT (US)

(72) Inventors: Andrey Viktorovich Filimonov, Kamenki (RU); Mikhail Sergeevich Kleshnin, Nizhny Novgorod (RU); Anna Yurievna Kerbeneva, Nizhny Novgorod (RU); Sean Edward Olive, Oak Park, CA (US); Joy Lyons, Seattle, WA (US)

(73) Assignee: HARMAN INTERNATIONAL INDUSTRIES, INCORPORATED, Stamford, CT (US)

( * ) Notice: Subject to any disclaimer, the term of this patent is extended or adjusted under 35 U.S.C. 154(b) by 176 days.

(21) Appl. No.: 18/682,469

(22) PCT Filed: Aug. 13, 2021

(86) PCT No.: PCT/RU2021/000352

§ 371 (c)(1),
(2) Date: Feb. 9, 2024

(87) PCT Pub. No.: WO2023/018349

PCT Pub. Date: Feb. 16, 2023

(65) Prior Publication Data

US 2024/0357279 A1 Oct. 24, 2024

(51) Int. Cl.
*H04R 1/22* (2006.01)
*H04R 29/00* (2006.01)

(52) U.S. Cl.
CPC ............ *H04R 1/22* (2013.01); *H04R 29/001* (2013.01); *H04R 2499/13* (2013.01)

(58) Field of Classification Search
CPC ...... H04R 1/22; H04R 29/001; H04R 29/007; H04R 2499/13
See application file for complete search history.

(56) References Cited

U.S. PATENT DOCUMENTS 8,311,232 B2 11/2012 Olive
2001/0028716 A1* 10/2001 Hill ..................... H04R 29/001 381/56

(Continued)

FOREIGN PATENT DOCUMENTS

| | | | |
|---|---|---|---|
| WO | 2005083921 | A1 | 9/2005 |
| WO | 2007089130 | A1 | 8/2007 |
| WO | 2022225413 | A1 | 10/2022 |

OTHER PUBLICATIONS

International Search Report and Written Opinion dated May 13, 2022 for PCT Appn. No. PCT/RU2021/000352 filed Aug. 13, 2021, 19 pgs.

(Continued)

*Primary Examiner* — Jason R Kurr
(74) *Attorney, Agent, or Firm* — BROOKS KUSHMAN P.C.

(57) ABSTRACT

A computer-implemented method for determining a frequency response of an audio system, the method comprising: training a Generative Adversarial Network, GAN, discriminator on a first training dataset comprising measured frequency responses of reference audio systems to a test signal and an evaluator scoring of the audio system to predict a predicted scoring for the reference audio systems, training a GAN generator on a second training dataset comprising evaluator scorings to predict a predicted frequency response for the reference audio systems, wherein training the GAN generator comprises processing the predicted frequency response by the trained GAN discriminator to predict a predicted scoring; and processing a production (Continued)

dataset comprising an input scoring of a production audio system by the trained GAN generator to predict a frequency response of the production audio system.

20 Claims, 6 Drawing Sheets

(56) References Cited

U.S. PATENT DOCUMENTS

| | | | | |
|---|---|---|---|---|
| 2009/0238370 | A1 | 9/2009 | Rumsey et al. | |
| 2018/0027348 | A1 * | 1/2018 | Aniya | H04R 29/002 381/58 |
| 2019/0087739 | A1 | 3/2019 | Olive et al. | |
| 2019/0325887 | A1 | 10/2019 | Karkkainen et al. | |
| 2022/0271724 | A1 * | 8/2022 | Quan | H04R 29/004 |

OTHER PUBLICATIONS

Donahue, C. et al., "Adversarial Audio Synthesis", arxiv.org, Cornell University Library, Feb. 12, 2018, 16 pgs.

Goodfellow, I. J. et al., "Generative Adversarial Nets", Jun. 10, 2014, 9 pgs., Retrieved from the Internet: URL:https://arxiv.org/pdf/1406.2661.pdf.

Pascual, S. et al., "SEGAN: Speech Enhancement Generative Adversarial Network", Interspeech 2017, Jun. 9, 2017, 4 pgs.

Gabrielsson, A. et al., "Perceived sound quality of reproductions with different frequency responses and sound levels", J. Acoust. Soc. Am., Sep. 1990, 8 pgs., vol. 88(3).

Pearson, K., "Note on regression and inheritance in the case of two parents", Proceedings of the Royal Society of London, Jun. 5, 1895, 3 pgs.

Soulodre, G. A. et al., "Subjective evaluation of new room acoustic measures", J. Acoust. Soc. Am., Jul. 1995, 8 pgs., vol. 98(1).

AES20-1996, "Aes recommended practice for professional audio—Subjective evaluation of loudspeakers", Jul. 14, 1998, 20 pgs.

Rayburn, R. (Ballou), "Handbook for Sound Engineers—Chapter 38: Virtual Systems", 2008, 19 pgs., Focal Press.

Floudas, C.A. et al.(Eds.), "Encyclopedia of Optimization, 2nd Edition", 2009, pp. 916-921, pp. 1263-1268, p. 1284, pp. 1386-1387, p. 1850, pp. 1872-1873, pp. 1897-1900, p. 2070, pp. 2422-2424, pp. 3760-3761, and pp. 4061-4062, Springer Science+ Buisiness Media, LLC.

Shalev-Shwartz, S. et al., "Understanding machine learning: From theory to algorithms", Cambridge University Press, 2014, 449 pgs.

Toole, F. E., "Loudspeaker measurements and their relationship to listener preferences: Part 2", J. Audio Eng. Soc., May 1986, 26 pgs., vol. 34, No. 5.

Jones, D. (Ballou), "Handbook for Sound Engineers—Chapter 4: Acoustical Noise Control", 2008, 30 pgs., Focal Press.

Szymanski, J. (Ballou), "Handbook for Sound Engineers—Chapter 5: Acoustical Treatment for Indoor Areas", 2008, 30 pgs., Focal Press.

Jones, D. (Ballou), "Handbook for Sound Engineers—Chapter 6: Small Room Acoustics", 2008, 20 pgs., Focal Press.

Ahnert, Dr. W. et al. (Ballou), "Handbook for Sound Engineers—Chapter 7: Acoustics for Auditoriums and Concert Halls", 2008, 56 pgs., Focal Press.

Ahnert, Dr. W. et al. (Ballou), "Handbook for Sound Engineers—Chapter 35: Computer Aided Sound System Design", 2008, 48 pgs., Focal Press.

Mapp, P. (Ballou), "Handbook for Sound Engineers—Chapter 36: Designing for Speech Intelligibility", 2008, 27 pgs., Focal Press.

* cited by examiner

METHOD FOR DETERMINING A FREQUENCY RESPONSE OF AN AUDIO SYSTEM

CROSS-REFERENCE TO RELATED APPLICATIONS

This application is the U.S. national phase of PCT Application No. PCT/RU2021/000352 filed on Aug. 13, 2021, the disclosure of which is hereby incorporated in its entirety by reference herein.

FIELD

The present disclosure relates to devices, methods, and systems for determining a frequency response of an audio system, in particular a car audio system. The frequency response is related to the sound quality of the audio system. The disclosure is applicable in the field of audio system design.

BACKGROUND

The human perception of audio tracks as reproduced by the audio system is a key measure for the quality of an audio system, for example a consumer audio system for a vehicle. The sound quality can be determined by human audio expert evaluators by listening to prepared sound recordings as played by the audio system and determining a score indicative of the sound quality. Furthermore, an audio system can be characterised by playing a test sound on the audio system, measuring the emitted sound and calculating a frequency response of the emitted sound. The development of audio systems benefits from the insights into the quality of audio systems gained from frequency responses and evaluator scorings. In particular, there is an interest in predicting a frequency response based on one or more predetermined scorings.

The following documents relate to determining and improving the sound quality of audio systems:

Soulodre G. A. Subjective evaluation of new room acoustic measures. J. Acoust. Soc. Am., vol. 98 (1), p. 294 (1995).

Ballou G. Handbook for Sound Engineers. Burlington, Focal Press (2008).

AES20-1996: AES recommended practice for professional audio—Subjective evaluation of loudspeakers (2008).

Toole F. Loudspeaker measurements and their relationship to listener preferences: Part 2. J. Audio Eng. Soc., vol. 34 (5), p. 323 (1986).

Gabrielsson A. et al. Perceived sound quality of reproductions with different frequency responses and sound levels. J. Acoust. Soc. Am., vol. 88 (3), p. 1359 (1990).

Olive S. Method for predicting loudspeaker preference. U.S. Pat. No. 8,311,232 (2005).

Olive S., Welti T., Khonsaripour O. Linear model to predict listener preference ratings of headphones. Patent Application US 2019/0087739 A1 (2018).

Moore B., Tan C., Zacharov N., Mattila V. Method for predicting the perceptual quality of audio signals. Patent Application WO 2005/083921 A1 (2018).

Pearson K. Note on regression and inheritance in the case of two parents. Proceedings of the Royal Society of London, vol. 58, p. 347 (1895).

Shai S., Shai B. Understanding machine learning: From theory to algorithms. Cambridge University Press (2014).

Goodfellow I. et al. Generative Adversarial Networks. arXiv: 1406.2661 (2014).

Floudas C. A., Pardalos, P. (Eds.) Encyclopedia of Optimization. Boston: Springer. (2008).

SUMMARY

Disclosed and claimed herein are systems, methods, and devices for determining a frequency response of an audio system.

A first aspect of the present disclosure relates to a computer-implemented method for determining a frequency response of an audio system. The method comprises the following steps:

- sending at least one test signal to a reference audio system of a plurality of reference audio systems;
- measuring a measured frequency response of each of the reference audio systems to the test signal;
- receiving one or more evaluator scorings of the reference audio systems from at least one human expert evaluator;
- training a Generative Adversarial Network, GAN, discriminator on a first training dataset comprising the measured frequency response and at least one of the evaluator scorings to predict predicted scorings for the reference audio systems based on frequency responses;
- training a GAN generator on a second training dataset comprising at least one of the evaluator scorings to predict a predicted frequency response for the audio system based on scorings, wherein training the GAN generator comprises processing the predicted frequency response by the trained GAN discriminator to predict a predicted scoring;
- receiving a production dataset comprising at least one input scoring of a production audio system; and
- processing the production dataset of the production audio system by the trained GAN generator to predict a predicted frequency response of the production audio system.

Accordingly, the method comprises a training phase, comprising the first five steps, and an inference phase, comprising the remaining steps.

In the training phase, training data are determined. A test signal is sent to reference audio systems, and a frequency response of each of the reference audio systems is measured. A thus determined frequency response to the test signal is related to the sound quality of the reference audio systems. In a further step, one or more evaluator scorings of the reference audio systems are received from at least one human expert evaluator. Preferably, an evaluator scoring is indicative of a plurality of individual scorings by a plurality of human expert evaluators. These data are included into a first training dataset and a second training dataset to train artificial neural networks pertaining to a Generative Adversarial Network (GAN).

The GAN comprises a GAN discriminator and a GAN generator. Both the GAN discriminator and the GAN generator may comprise artificial neural networks, in particular fully connected neural networks. The GAN discriminator is adapted to predict the expert evaluator scoring of an audio system in response to receiving a frequency response of the audio system. In an exemplary embodiment, the GAN discriminator may comprise an artificial neural network as described in international application PCT/RU2021/000171 filed Apr. 23, 2021, the entire disclosure of which is incorporated herein by reference. The GAN discriminator is trained on a first training dataset which comprises the measured frequency response and at least one of the evaluator scorings to predict a predicted scoring for the reference audio systems. An evaluator scoring indicates a subjective audio quality of the audio system by one or more human expert evaluators. The evaluator scoring may relate to only one individual scoring, but an indication of a plurality of scorings, either as an average scoring or as a distribution of scorings, is preferred. In particular, a distribution of scorings increases the accuracy of the prediction of the frequency response by he GAN generator, as detailed below. Training may be done by supervised learning, for example by back-propagation, to determine the weights to reach a local minimum of a discrepancy between the predicted scoring and the evaluator scoring of the first training dataset. The discrepancy may be determined as a mean squared error.

The generator is adapted to predict the frequency response of the audio system to the test signal in response to receiving an expert evaluator scoring. The GAN generator is trained on a second training dataset comprising at least one of the evaluator scorings to predict a predicted frequency response for the audio system. Training of the GAN generator thus does not by itself require the use of the measured frequency responses. Rather, the second training dataset comprises evaluator scorings of the audio system, which may be the same as those of the first training dataset. The evaluator scorings are sent to the input of the GAN generator. The frequency response predicted by the GAN generator is processed by the frequency response by the trained GAN discriminator to predict a predicted scoring. The trained GAN discriminator is thereby used as a tool for training the GAN generator, and determines scorings related to the output of the GAN generator.

The GAN generator is designed as a generative, rather than predictive, neural network. The GAN generator is trained to create the most likely frequency response for a given scoring distribution. Therefore, a response space of the output of the GAN generator is continuous and more resistant to random errors in the training data as compared to a predictive neural network. This effect results from using the GAN discriminator for the training of the GAN generator, rather than directly training the GAN generator on a training dataset comprising scorings and frequency responses.

Upon inference, the trained GAN generator is used to predict a frequency response of a production audio system. The GAN generator receives the predetermined input scoring of an audio system and determines the frequency response. The data are applicable for the development of the audio system and/or the environment.

In an embodiment, a validator compares the predicted scorings to the evaluator scorings sent to the input of the GAN generator and determines a discrepancy between the predicted scorings and the evaluator scoring. The GAN generator further adjusts one or more weights of the GAN generator to minimize the discrepancy. This may comprise reducing the discrepancy towards a local minimum. The discrepancy may be determined as a mean squared error.

In a further embodiment, training the GAN generator further comprises keeping weights of the GAN discriminator constant. Thereby, the training processes are separated, and the GAN discriminator is used solely as a mechanism for training the GAN generator. For this training step, the measured frequency responses are not needed because the information is included in the weights of the trained GAN discriminator.

In a further embodiment, the first training dataset, the second training dataset, and/or the production dataset comprise an indication of one or more of:

- the audio system;
- one or more settings of the audio system as applied when measuring the frequency response;
- type and/or properties of an environment in which the frequency response is measured.

These additional data are received by an input layer of the GAN generator and/or discriminator and influence the prediction. Preferably, all three datasets comprise identical supplementary data subsets comprising one or more of the above.

Examples for an indication of the audio system comprise a manufacturer's brand, a type of the audio system a number of audio channels, the presence of a subwoofer, a maximum output power, relative positions of the speakers, or declared frequency responses of the system components. Examples for settings are volume or playback mode (stereo, or surround). In the case of a vehicle audio system, the indication may comprise an encoded representation of a vehicle manufacturer, a body type of the vehicle, cabin upholstery, market segment.

Thereby, the GAN discriminator and the GAN generator are trained for a variety of configurations, and the trained GAN generator can predict how the frequency response of an audio system of the desired quality, as reflected by the input dataset, depends on changes in the audio system and the environment.

In a further embodiment, each of the evaluator scorings comprises a plurality of individual scorings of the reference audio system from a plurality of human expert evaluators. Thereby, a distribution of scores is used. In principle, a vector of scorings, wherein each component indicates a scoring of one human expert evaluator, can be included. Preferably, a histogram-type vector corresponding to the scale of scores is used. Each component of the vector indicates a number of expert evaluators who have rated the audio system at the corresponding score. Alternative data types, such as analytical functions, or databases, may be used.

In a further embodiment, the evaluator scorings relate to the sound quality as perceived at the location where the experimental frequency response is measured. In particular, the frequency response may be measured at the physical location where the expert evaluators are located. If, for example, the frequency response is determined for car audio system, measurements may be taken near the driver's headrest, where the ears of the expert evaluators are located, which increases the reliability of the frequency response prediction by the GAN generator.

In a further embodiment, the measured frequency response of the reference audio system is measured in a standard production environment. This is an alternative to measuring the frequency response in a standardized room or an anechoic chamber. A standard production environment is an environment in which the reference audio system is typically used. For example, for a car audio system, a car interior is a standard production environment. Measurement in a standard production environment allows taking into account typical features of the environment, including reflection of sound by walls and/or objects in the environment.

In a further embodiment, the standard production environment comprises one or more of a vehicle interior, a concert hall, and/or a home theatre. Thereby, the predicted frequency response may be used for changes in the environment to improve the sound quality.

In a further embodiment, the method is used for predicting a frequency response of an audio system. The predicted frequency may then serve as a basis for improvement of the audio system and/or the environment. For example, a frequency response of an existing audio system may be predicted. Furthermore, a frequency response may be predicted under the condition that some parameters of the audio system (such as volume settings or the type of the speakers) or the environment (such as another type of car seats in the case of a car audio system). Thereby, the frequency responses due to changes in the audio system can be predicted, and prototypes may be designed to fit a predicted frequency response. Development of an audio system may be further improved by comparing the predicted frequency response to, e. g. a measured frequency response of a prototype to validate the data.

A second aspect of the present disclosure relates to a system for determining a frequency response of an audio system. The system comprises one or more of at least one signal generator, at least one frequency response detector, at least one input unit, at least one computing device, a processing unit, and memory for executing the steps of any of the preceding claims. In particular, the system may comprise:

at least one signal generator to generate the test signal;

at least one frequency response detector, which may comprise a sound detecting device and an impulse response to frequency response transformer;

at least one input unit to receive the expert valuator scorings;

at least one computing device comprising the GAN discriminator, GAN generator, and a validator, which may be implemented in software;

a processing unit; and/or a memory.

The memory comprises instructions that, when executed by the processing unit, cause the computing device to execute a method of the first aspect of the present disclosure. All properties and embodiments that apply to the first aspect also apply to the second aspect.

BRIEF DESCRIPTION OF THE DRAWINGS

The features, objects, and advantages of the present disclosure will become more apparent from the detailed description set forth below when taken in conjunction with the drawings in which like reference numerals refer to similar elements.

DETAILED DESCRIPTION OF THE PREFERRED EMBODIMENTS

Figure 1:
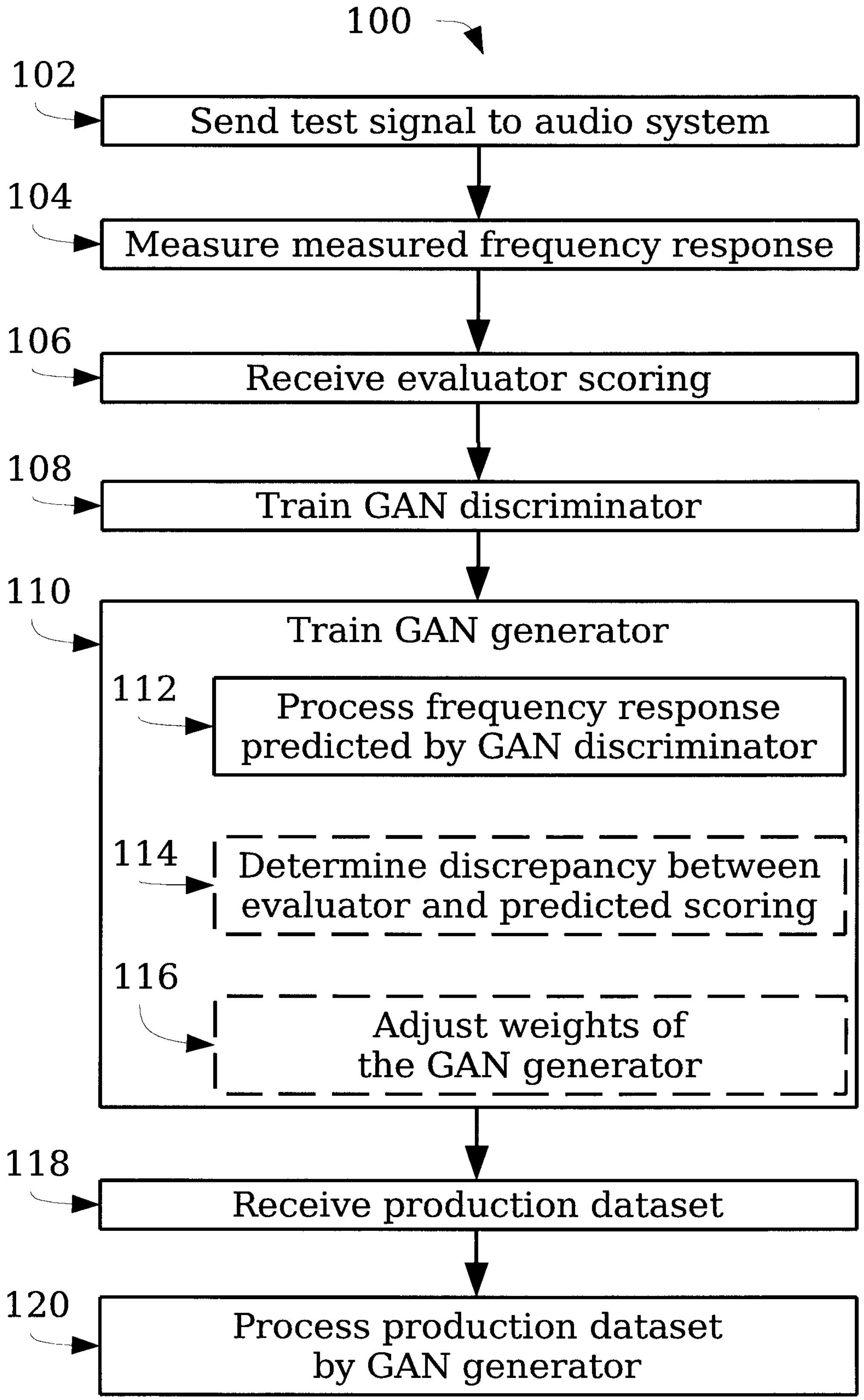
FIG. 1 shows a flow chart of a method for determining a frequency response.

FIG. 1 shows a flow chart of a computer-implemented method 100 for determining a frequency response according to an embodiment. The method comprises the steps 102-116 of a training phase 108-116 and steps 118-120 of an inference phase. Training and inference can be executed by the system 200 of FIG. 2.

The computer-implemented method 100 begins by sending, 102, a test signal to at least one audio system. As a test signal, a variety of signals can be sent. Preferably a noise signal, for example pink noise, is sent, which is advantageous since noise comprises a wide frequency range. The audio system is configured to play the test signal. The frequency response to the test signal is measured, 104. Preferably, this comprises recording an impulse response, e. g. with a microphone, and transforming the impulse response electronically into a frequency response, e. g. by applying a transform, such as a Fast Fourier Transform, or a Continuous Wavelet Transform. Furthermore, an evaluator scoring is received, 106, which indicates a quality of the same audio system. The evaluator scorings indicate the assessment of one or more human expert evaluators of the quality of the sound system, for example on a scale from 1 to 10. Preferably, a plurality of individual scorings from a plurality of expert evaluators is received. For each audio system, each scoring indicates the sound experience of the expert evaluator at a predetermined position when the audio system is playing a predefined playlist comprising one or more audio files, such as music tracks. The audio system is preferably set to a predefined set of audio settings, such as volume levels, which are typical for the usage of the audio system. The expert evaluator is preferably located at a position where a user of a system is typically located. If a vehicle audio system is tested, the expert evaluator may sit in the driver's seat. In order to collect a training dataset, frequency response and evaluator scoring may be determined for each of a plurality of audio systems.

The Generative Adversarial Network (GAN) comprises a discriminator network and a generator network. Both networks comprise artificial neural networks, preferably convolutional neural networks. The GAN discriminator is trained, 108, on a first training dataset to predict an evaluator scoring of an audio system in response to receiving a frequency response of the audio system. The first training dataset comprises one or more of the evaluator scorings and the measured frequency responses determined above. The training process is executed as described with reference to FIG. 4. By the training process, weights of the GAN discriminator are determined. The trained GAN discriminator can be used to determine a scoring, independently from the GAN generator. Alternatively or additionally, the GAN discriminator can be used to train a GAN generator as described below.

The GAN generator is trained, 110, to predict a frequency response of an audio system in response to receiving one or more evaluator scorings of the audio system. A second training dataset that comprises one or more evaluator scorings is used. The second training dataset may comprise different scorings compared to the first dataset. However, preferably the same scorings as in the first dataset are included. This allows using a large training dataset in both GAN discriminator and GAN generator training, which increases the accuracy of the trained neural networks. Upon training, the evaluator scorings of the second training dataset are sent to the GAN generator to predict frequency responses, and predicted frequency responses are processed, 112, by the GAN discriminator to predict evaluator scorings. Preferably, a validator determines, 114, a discrepancy between an evaluator scoring and the predicted scoring, and adjusts, 116, weights of the GAN generator. The training process is further described with reference to FIG. 5.

In the inference phase, a production dataset is received, 118. The production dataset comprises an evaluator scoring of an audio system. The GAN generator processes, 120, the production dataset to predict a frequency response of the audio system, as further described with reference to FIG. 5.

Figure 2:
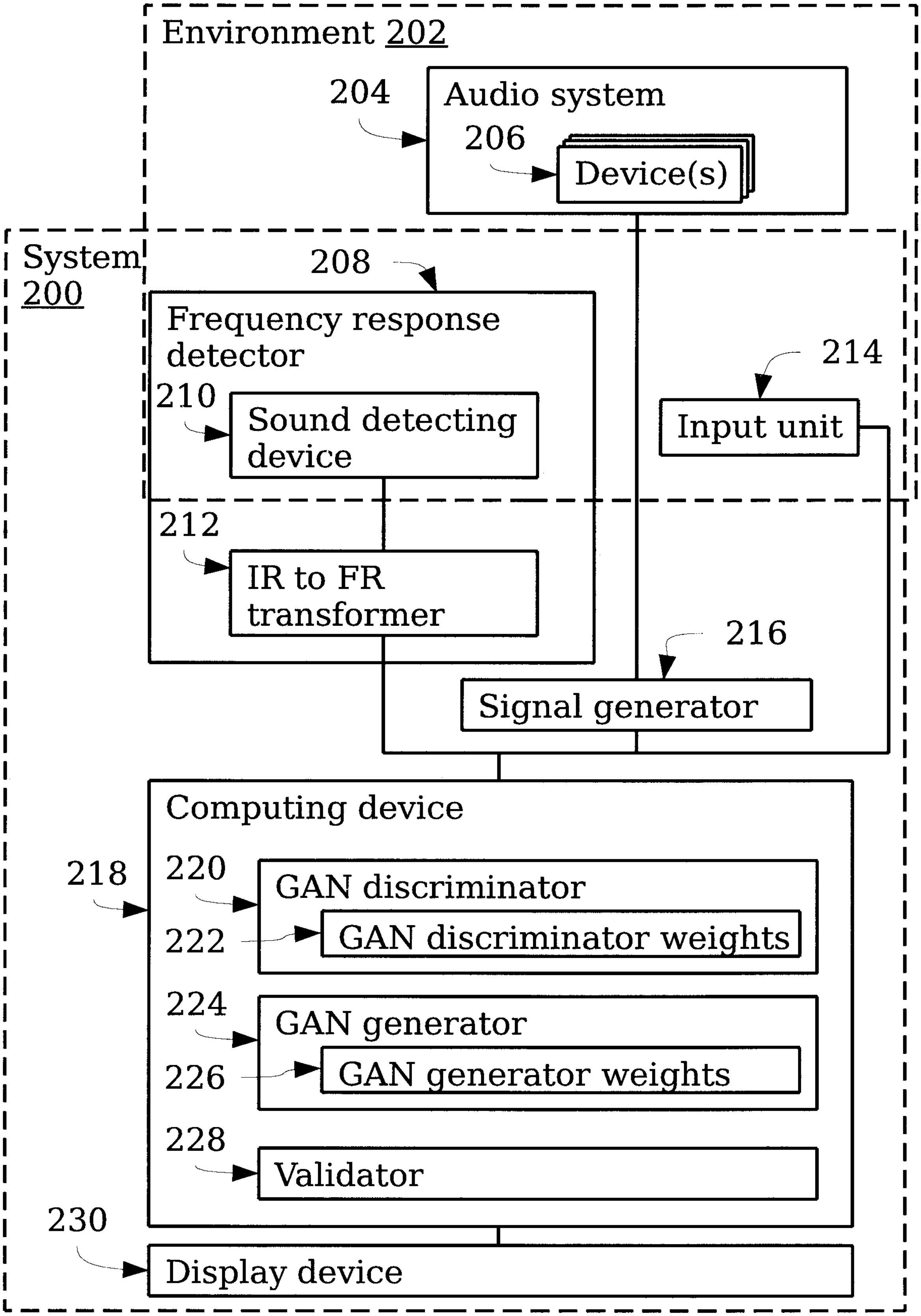
FIG. 2 shows a block diagram of a system and an environment.

FIG. 2 shows a block diagram of a system 200 for predicting a frequency response of an audio system 204 according to an embodiment. The audio system 204 comprises one or more devices 206 and is used as a sound reference for training. The audio system 204 may comprise devices 206, e. g. one or more speakers. Preferably, for a plurality of audio systems, the frequency responses and evaluator scorings are determined to obtain large training datasets. For training, the audio systems are placed in an environment 202, which may be a standard test room for an audio system in order to obtain comparable results for audio systems. This increases consistency of the training dataset if the audio system 204 is a standalone audio system. Alternatively, audio system 204 may be placed in a production environment 202, in which the audio system is typically used. For example, frequency response for a car audio system may be determined in a vehicle. The system 200 comprises components 208-230, which may be entirely or in part comprised in the production environment. Typically, the sound detecting device and the input unit are comprised in the environment 202, whereas the other components can be outside environment 202, e. g. off-site, and are communicably coupled to the components in the environment 202.

In this example, the system comprises a signal generator 216 to generate a test signal. As a test signal, noise, e. g., pink noise may be chosen. The test signal is sent, 102, to the audio system 204 for output. The audio system 204 may be set to a predetermined test configuration, including setting the gain to a predetermined level, preferably a level as typically used in the production environment. If the audio system 204 and the environment react linearly to gain, only one measurement has to be carried out at a constant gain. The frequency response of the audio system 204 is then determined by the frequency response detector 208: The sound emitted by the audio system 204 in time domain, i. e. the impulse response, is measured by the sound recording device 210, e. g. a microphone. The sound recording device may be positioned at a place where the head of a user of the system is typically located, such as in proximity to a headrest of a driver's seat in case of a car audio system. The IR to FR transformer 212 transforms the impulse response to a frequency response. This step can comprise, e. g., application of a Fast Fourier Transform (FFT) or a Continuous Wavelet Transform (CWT). The frequency response is then sent to the computing device 218. The computing device 218 is configured to perform the steps 106-120 of method 100 (FIG. 1).

The computing device 218 comprises a GAN discriminator 220. The GAN discriminator 220 is an artificial neural network. By determining weights 222, the GAN discriminator 220 may be trained to predict a scoring of an audio system. The computing device 218 further comprises a GAN generator 224 with weights 226, which may be trained to predict a frequency response of the audio system. The validator 228 is operable to determine and locally minimize a discrepancy between measured data and data predicted by the GAN discriminator 220 and/or the GAN generator 224. This may include calculating a loss function, for example a mean squared error, and determining a local minimum of the loss function. Measured data, used as a ground truth, and predicted data may include frequency responses and scorings. The components 220-228 of the computing device may be implemented in hardware or software. Preferably, components 220-228 are implemented in software. The software may comprise a desktop application in order to allow one or more steps of method 100 to be executed on a workstation or mobile device. For their execution, standard processing and memory devices may be used.

In this exemplary embodiment, the transformer 212 and the signal generator 216 are shown as distinct from the computing device 218. However, the transformer 212 and the signal generator 216 may be part of the computing device in embodiments. In further embodiments, the transformer 212 and the signal generator 216 may be implemented in software.

The system 200 of this exemplary embodiment further comprises an input unit 214 to receive an input indicative of the evaluator scoring by audio expert evaluators. The input may comprise any quantified measure of the quality of the audio system 204. For example, the evaluators may give a rating for the quality of the audio system 204 based on a predefined number of tracks played by the audio system in a reference environment. A score may be given as a numeric value, e. g. on a scale from 0 to 9, and indicate how the audio system 204 compares to a predetermined reference audio system 204. Preferably, the evaluator scoring comprises a plurality of individual scorings from different expert evaluators, for example, a histogram comprising the number of individual scorings for each possible value on the scale. However, also other data formats can be chosen as known in the art. The evaluator scoring may then be used by the validator 228 to train the GAN discriminator 220 and the GAN generator 224.

Upon inference, the computing system 218 is adapted to predict, by the GAN generator 224, a frequency response of the audio system 204 from an input scoring. In an exemplary embodiment, a prototype of a new audio system is to be tested. In order to improve the audio system, a predetermined distribution of scorings is entered via input unit 214 into system 200 and the computing device 218 predicts a frequency response and outputs the response on display device 230. The frequency response can then be used to improve the prototype audio system to better match the predicted frequency response.

The components of the system 200 can be included in one device, but components may also be distributed over many devices. In particular, the computing device 218 may be implemented as a virtual machine or a process running on a plurality of computers, e. g. network-accessible compute servers.

Figure 3:
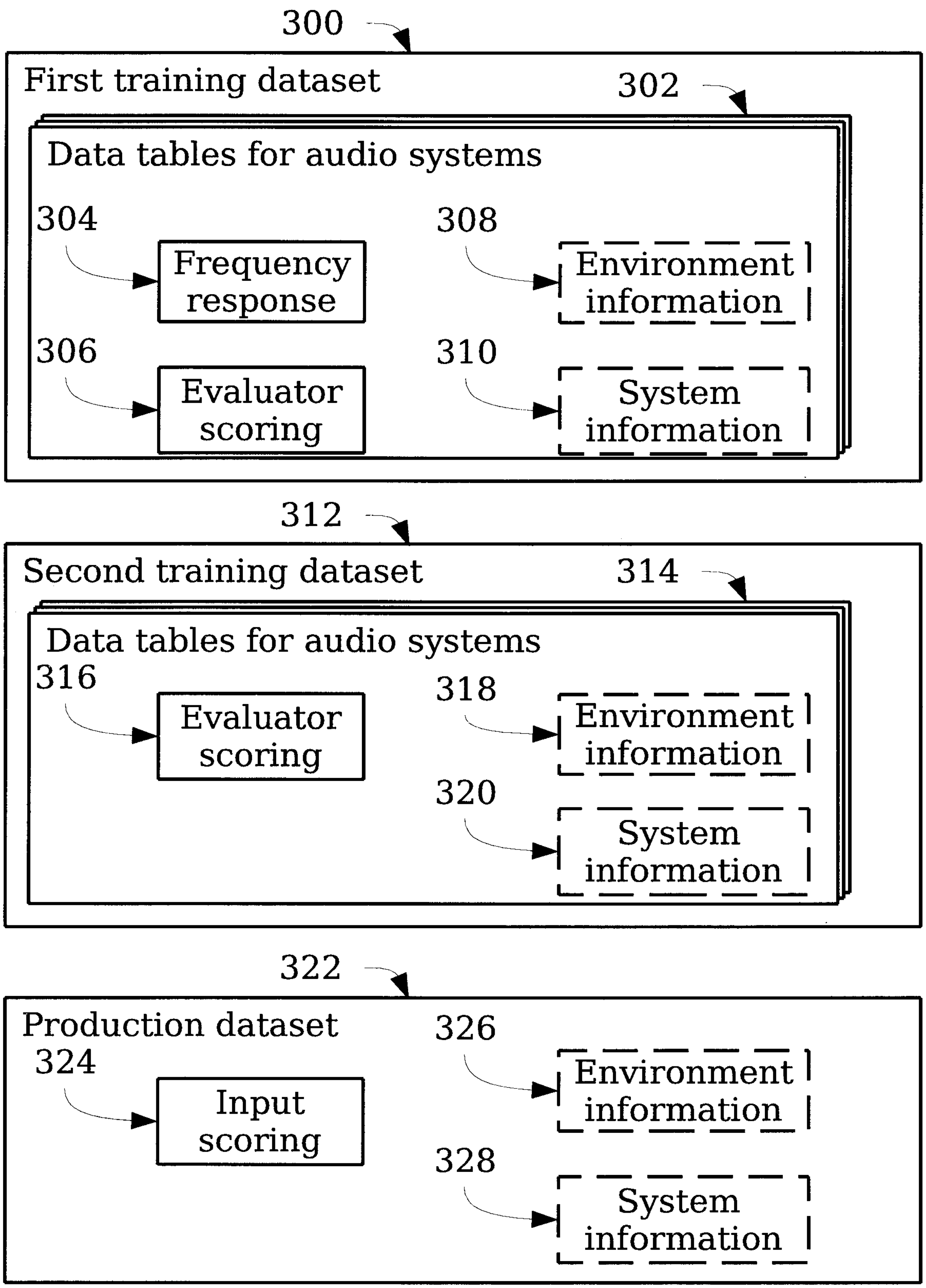
FIG. 3 shows a block diagram of first and second training datasets and a production dataset.

FIG. 3 shows a block diagram of datasets 300, 312, 322. The first training dataset 300 is adapted for training the GAN discriminator 220. Dataset 300 comprises a plurality of data tables, each of which comprises data 304-310 related to one audio system. Including a large number, e. g., hundreds, of data tables for different audio systems serves to improve the accuracy of the training. Different data tables may also relate to different configurations of the same audio system.

One data table comprises a frequency response 304 of the audio system 204. The frequency response 304 is typically a measured frequency response of the audio system 204 to the test signal. The data table further comprises an evaluator scoring 306 of the audio system 204. Preferably, the evaluator scoring 306 comprises a plurality of individual scorings of a plurality of expert evaluators, or a histogram that indicates the number of scorings for each value of the score. In that case, the GAN discriminator 220 is trained to determine a distribution of scorings. Optionally, the data table may comprise environment information related to the environment 202 in which the audio system 204 was tested, such as type (standard or production environment) and properties of the environment, such as size of a room or type of walls. Optionally, information 310 on the audio system 204 can be included, such as the brand, the model, and/or characteristics of the audio system. Characteristics may comprise the number of channels, the presence of a predetermined type of speaker, a maximum output sound power, relative positions of speakers, and/or declared frequency responses of the individual speakers.

The second training dataset 312 comprises a plurality of data tables 314 for audio system 204. Preferably, the same audio systems are used to train both the GAN generator 224 and the GAN discriminator 220. For each audio system or configuration, a scoring, 316 is included. The evaluator scoring 316 may be identical to the evaluator scoring 306 to allow re-use of training data and to obtain a consistent training result for both GAN discriminator 220 and GAN generator 224. Corresponding environment information 318 and system information 320 can be included to increase the prediction accuracy. The embodiments and properties of information 308, 310 also apply to information 318 and 320. In an exemplary embodiment, the second training dataset 312 may comprise the same information as the first training dataset 300 except for the lack of information on the frequency response. However, differences between the first training dataset 300 and the second training dataset 312 may exist. If for example, for one or more audio systems only the evaluator scorings are available, the evaluator scorings can be used for training of the GAN generator 224 without being used for the training of the GAN discriminator 220.

The production dataset 322 comprises a predetermined input scoring 324. The input scoring may be freely chosen, e. g., to represent a comparably good scoring. Optionally, the environment information 326 and the system information 328 are included. Processing the production dataset then yields the predicted frequency spectrum of the audio system.

Figure 4:
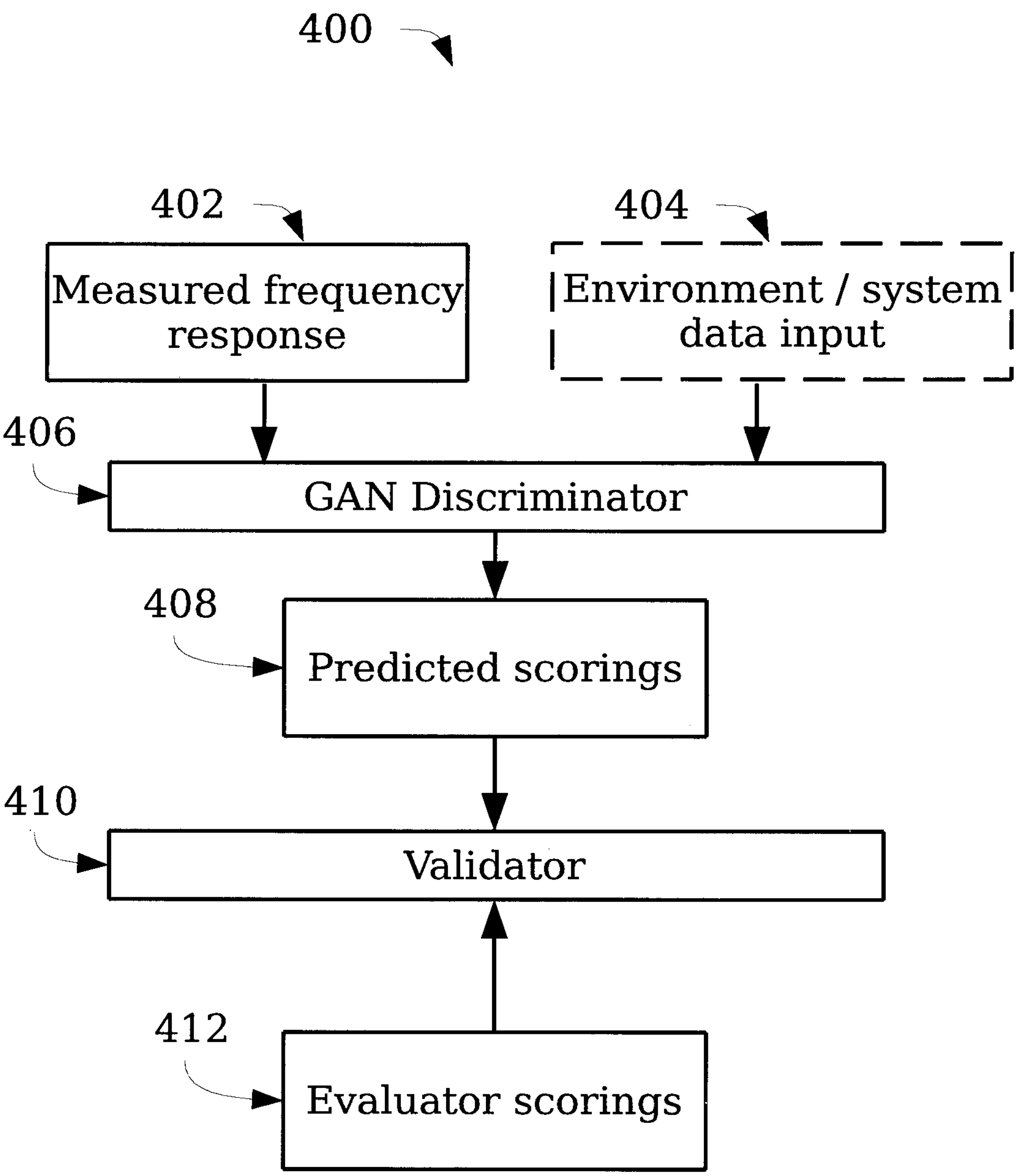
FIG. 4 shows a block diagram of an arrangement of components for training the GAN discriminator.

FIG. 4 shows a block diagram of an arrangement 400 of components 402-412 for training the GAN discriminator 406. The diagram represents the input and output of data 402, 404, 408, and 412 into programmes 406 and 410. To train the GAN discriminator 406, the frequency response 402 and optionally environment and/or system information 404 of the audio system are sent to an input layer of the GAN discriminator 406. The GAN discriminator 406 predicts scorings 408 of the audio system. Validator 410 receives the predicted scorings 408 and the evaluator scorings 410 as a ground truth and trains the GAN discriminator to minimize a discrepancy between the predicted and evaluator scorings. Techniques of supervised learning, such as backpropagation, may be used. After training the GAN discriminator is operable to predict a scoring of the audio system.

Figure 5:
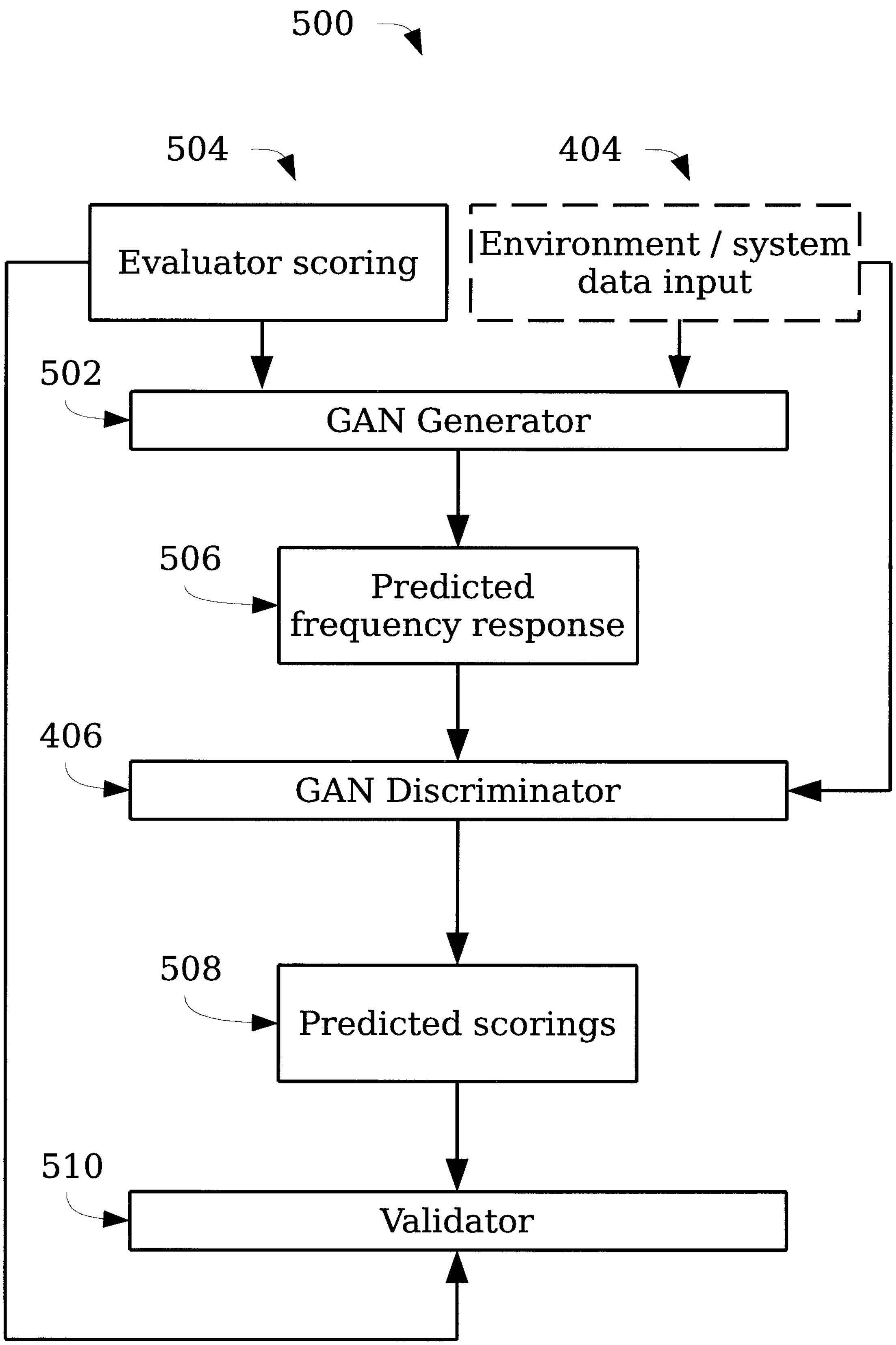
FIG. 5 shows a block diagram of an arrangement of components for training the GAN generator.

FIG. 5 shows a block diagram of an arrangement 500 of components for training the GAN generator 502. The diagram represents the input and output of data 404, 504, 422, and 506 into programmes 406 and 502, and 510. To train the GAN generator 502, the evaluator scorings 504 and optionally environment and/or system information 404 of the audio system are sent to an input layer of the GAN generator 502. The GAN generator 502 predicts a frequency response 506 of the audio system. In this training phase, inference of the trained GAN discriminator 406 is used to determine a predicted scoring 508, that is validated by the validator 510 against the same evaluator scoring 504 that is sent to the input layer of the GAN generator. Validator 510 receives the predicted scorings 508 and the evaluator scorings 504 as a ground truth and trains the GAN discriminator to minimize a discrepancy between the predicted and evaluator scorings, by, e. g., supervised learning, such as backpropagation, may be used. After training the GAN discriminator is operable to predict a scoring of the audio system.

Figure 6:
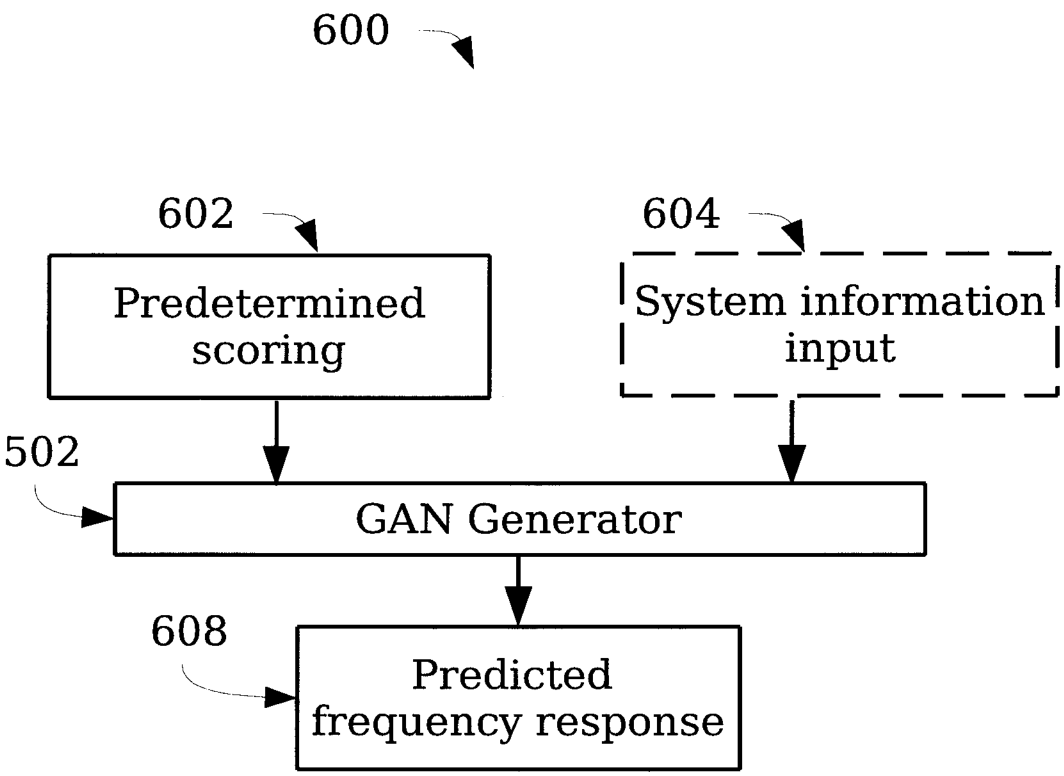
FIG. 6 shows a block diagram of an arrangement of components for inference.

FIG. 6 shows a block diagram of an arrangement of components 600 for inference. A predetermined scoring 602 and, optionally, system information input 604 of an audio system are sent to the input layer of the trained GAN generator 502. The GAN generator predicts a frequency response 606.

REFERENCE SIGNS

100 Computer-implemented method
102-120 Steps of method 100
200 System
202 Environment
204 Audio system
206 Device(s)
208 Frequency response detector
210 Sound detecting device
212 IR to FR transformer
214 Input unit
216 Signal generator
218 Computing device
220 GAN generator
222 Weights of the GAN generator
224 GAN discriminator
226 Weights of the GAN discriminator
228 Validator
230 Display device
300 First training dataset
302 Data tables for audio systems
304 Measured frequency response
306 Evaluator scoring
308 Environment information
310 System information
312 Second training dataset
314 Data tables for audio systems
316 Evaluator scoring
318 Environment information
320 System information
322 Production dataset
324 Input scoring of a production audio system
326 Environment information
328 System information
400 Arrangement of components for training the GAN discriminator
402 Measured frequency response
404 System information output
406 GAN discriminator
408 Predicted scorings
410 Validator
412 Evaluator scorings
500 Arrangement of components for training the GAN generator
502 GAN generator
504 Evaluator scorings
506 Predicted frequency response
508 Predicted scorings
510 Validator

600 Arrangement of components for inference
602 Predetermined scoring
604 System information input
606 Predicted frequency response

The invention claimed is:

1. A computer-implemented method for determining a frequency response of an audio system, the method comprising:

sending at least one test signal to a reference audio system of a plurality of reference audio systems;

measuring a measured frequency response of each of the reference audio systems to the test signal;

receiving one or more evaluator scorings of the reference audio systems from at least one human expert evaluator;

training a Generative Adversarial Network (GAN) discriminator on a first training dataset comprising the measured frequency response and at least one of the evaluator scorings to predict predicted scorings for the reference audio systems based on frequency responses;

training a GAN generator on a second training dataset comprising at least one of the evaluator scorings to predict a predicted frequency response for the reference audio systems based on scorings, wherein training the GAN generator comprises processing the predicted frequency response by the trained GAN discriminator to predict a predicted scoring;

receiving a production dataset comprising at least one input scoring of a production audio system; and processing the production dataset of the production audio system by the trained GAN generator to predict a predicted frequency response of the production audio system.

2. The computer-implemented method of claim 1, wherein training the GAN generator further comprises, by a validator, determining a discrepancy between the predicted scoring and the evaluator scoring, and adjusting one or more weights of the GAN generator to minimize the discrepancy.

3. The computer-implemented method of claim 1, wherein training the GAN generator further comprises keeping weights of a GAN discriminator constant.

4. The computer-implemented method of claim 1, wherein at least one of the first training dataset, the second training dataset, and the production dataset comprise an indication of one or more of:

a type of the audio system;

one or more settings of the audio system as applied when measuring the frequency response; and at least one of a type and properties of an environment in which the frequency response is measured.

5. The computer-implemented method of claim 1, wherein each of the evaluator scorings comprises a plurality of individual scorings of the reference audio system from a plurality of human expert evaluators.

6. The computer-implemented method of claim 1, wherein the evaluator scorings relate to a sound quality as perceived at a location where an experimental frequency response is measured.

7. The computer-implemented method of claim 1, wherein the measured frequency response of the reference audio system is measured in a standard production environment.

8. The computer-implemented method of claim 7, wherein the standard production environment comprises at least one of a vehicle interior, a concert hall, and a home theatre.

9. The computer-implemented method of claim 1 for predicting a sound quality of an audio system.

10. A system for determining a frequency response of an audio system, the system comprising at least a processing unit to execute the method of claim 1.

11. A computer-implemented method for determining a frequency response of an audio system, the method comprising:

measuring a measured frequency response of each of a plurality of reference audio systems based on at least one test signal;

receiving one or more evaluator scorings of the plurality of reference audio systems from at least one human expert evaluator;

training a Generative Adversarial Network (GAN) discriminator on a first training dataset comprising the measured frequency response and at least one of the evaluator scorings to predict predicted scorings for the reference audio systems based on frequency responses;

training a GAN generator on a second training dataset comprising at least one of the evaluator scorings to predict a predicted frequency response for the reference audio systems based on scorings, wherein training the GAN generator comprises processing the predicted frequency response by the trained GAN discriminator to predict a predicted scoring;

receiving a production dataset comprising at least one input scoring of a production audio system; and processing the production dataset of the production audio system by the trained GAN generator to predict a predicted frequency response of the production audio system.

12. The computer-implemented method of claim 11, wherein training the GAN generator further comprises, by a validator, determining a discrepancy between the predicted scoring and the evaluator scoring, and adjusting one or more weights of the GAN generator to minimize the discrepancy.

13. The computer-implemented method of claim 11, wherein training the GAN generator further comprises keeping weights of the GAN discriminator constant.

14. The computer-implemented method of claim 11, wherein at least one of the first training dataset, the second training dataset, and the production dataset comprise an indication of one or more of:

a type of the audio system;

one or more settings of the audio system as applied when measuring the frequency response; and at least one of a type and properties of an environment in which the frequency response is measured.

15. The computer-implemented method of claim 11, wherein each of the evaluator scorings comprises a plurality of individual scorings of the reference audio system from a plurality of human expert evaluators.

16. The computer-implemented method of claim 11, wherein the evaluator scorings relate to a sound quality as perceived at a location where an experimental frequency response is measured.

17. The computer-implemented method of claim 11, wherein the measured frequency response of the reference audio system is measured in a standard production environment.

18. The computer-implemented method of claim 17, wherein the standard production environment comprises at least one of a vehicle interior, a concert hall, and a home theatre.

19. The method of claim 11 for predicting a sound quality of an audio system.

20. A system for determining a frequency response, the system comprising:

memory; and a processing unit operably coupled to the memory and being programmed to:

transmit at least one test signal to a reference audio system of a plurality of reference audio systems;

measure a measured frequency response of each of the reference audio systems to the test signal;

receive one or more evaluator scorings of the reference audio systems from at least one human expert evaluator;

train a Generative Adversarial Network (GAN) discriminator on a first training dataset comprising the measured frequency response and at least one of the evaluator scorings to predict predicted scorings for the reference audio systems based on frequency responses;

train a GAN generator on a second training dataset comprising at least one of the evaluator scorings to predict a predicted frequency response for the reference audio systems based on scorings, wherein training the GAN generator comprises processing the predicted frequency response by the trained GAN discriminator to predict a predicted scoring;

receive a production dataset comprising at least one input scoring of a production audio system; and process the production dataset of the production audio system by the trained GAN generator to predict a predicted frequency response of the production audio system processing the production dataset of the production audio system by the trained GAN.

* * * * *